United States Patent
Ronchetto et al.

(10) Patent No.: US 10,626,048 B2
(45) Date of Patent: Apr. 21, 2020

(54) DISSOLVABLE SEALANT FOR MASKING GLASS IN HIGH TEMPERATURE ION EXCHANGE BATHS

(71) Applicant: PALO ALTO RESEARCH CENTER INCORPORATED, Palo Alto, CA (US)

(72) Inventors: Erica Ronchetto, Mountain View, CA (US); Scott J. H. Limb, Palo Alto, CA (US); Robert D. Fosdyck, Rolla, MO (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 184 days.

(21) Appl. No.: 15/844,997

(22) Filed: Dec. 18, 2017

(65) Prior Publication Data
US 2019/0185375 A1 Jun. 20, 2019

(51) Int. Cl.
C03C 21/00 (2006.01)
C03C 23/00 (2006.01)
C03C 3/04 (2006.01)

(52) U.S. Cl.
CPC .............. *C03C 21/005* (2013.01); *C03C 3/04* (2013.01); *C03C 21/002* (2013.01); *C03C 23/0075* (2013.01); *C03C 2201/06* (2013.01); *C03C 2217/256* (2013.01); *C03C 2218/34* (2013.01)

(58) Field of Classification Search
CPC ..... C03C 21/005; C03C 3/04; C03C 23/0075; C03C 2201/06; C03C 2218/34; C03C 2217/256
See application file for complete search history.

(56) References Cited

U.S. PATENT DOCUMENTS

| | | | |
|---|---|---|---|
| 2,344,250 A * | 3/1944 | Jones | C03C 21/005 359/580 |
| 3,397,278 A | 8/1968 | Pomerantz | |
| 4,102,664 A | 7/1978 | Dumbaugh | |
| 4,598,274 A | 7/1986 | Holmes | |
| 5,374,564 A | 12/1994 | Bruel | |
| 7,002,517 B2 | 2/2006 | Noujeim | |
| 7,153,758 B2 | 12/2006 | Hata et al. | |
| 7,554,085 B2 | 3/2009 | Lee | |
| 8,130,072 B2 | 3/2012 | De Bruyker et al. | |
| 9,154,138 B2 | 10/2015 | Limb et al. | |
| 9,356,603 B2 | 5/2016 | Limb et al. | |
| 9,577,047 B2 | 2/2017 | Chua et al. | |
| 9,780,044 B2 | 10/2017 | Limb et al. | |
| 2001/0014409 A1 * | 8/2001 | Cohen | B81C 1/00126 428/606 |

(Continued)

*Primary Examiner* — Queenie S Dehghan
(74) *Attorney, Agent, or Firm* — Miller Nash Graham & Dunn LLP

(57) ABSTRACT

A method of masking glass in an ion exchange bath includes applying a dissolvable sealant to a cover material, adhering the cover material to a glass part to form a mask on the glass part, immersing the glass part into an ion exchange bath, removing the glass part from the ion exchange bath, and using a solvent to dissolve the sealant and the cover material from the glass part. A mask on glass having a piece of glass, and a dissolvable sealant on a cover material, the dissolvable sealant comprising an inorganic material and a silicate, the dissolvable sealant between the cover material and the piece of glass.

11 Claims, 5 Drawing Sheets

(56) References Cited

U.S. PATENT DOCUMENTS

| | | |
|---|---|---|
| 2004/0062896 A1* | 4/2004 | Picone .................. B32B 7/06 428/40.1 |
| 2004/0222500 A1 | 11/2004 | Aspar et al. |
| 2005/0084679 A1 | 4/2005 | Sglavo et al. |
| 2005/0176573 A1 | 8/2005 | Thoma et al. |
| 2006/0138798 A1 | 6/2006 | Oehrlein |
| 2006/0270190 A1 | 11/2006 | Nastasi et al. |
| 2008/0311686 A1 | 12/2008 | Morral et al. |
| 2009/0086170 A1 | 4/2009 | El-Ghoroury et al. |
| 2010/0035038 A1 | 2/2010 | Barefoot et al. |
| 2011/0183116 A1 | 7/2011 | Hung et al. |
| 2012/0135177 A1 | 5/2012 | Cornejo et al. |
| 2012/0135195 A1 | 5/2012 | Glaesemann et al. |
| 2012/0196071 A1 | 8/2012 | Cornejo et al. |
| 2012/0288676 A1 | 11/2012 | Sondergard et al. |
| 2013/0037308 A1 | 2/2013 | Wang et al. |
| 2013/0082383 A1 | 4/2013 | Aoya |
| 2013/0140649 A1 | 6/2013 | Rogers et al. |
| 2013/0192305 A1 | 8/2013 | Black et al. |
| 2014/0103957 A1 | 4/2014 | Fritz et al. |
| 2014/0266946 A1 | 9/2014 | Billy et al. |
| 2014/0300520 A1 | 10/2014 | Nguyen et al. |
| 2014/0323968 A1 | 10/2014 | Rogers et al. |
| 2015/0001733 A1 | 1/2015 | Karhade |
| 2015/0044445 A1 | 2/2015 | Garner et al. |
| 2015/0076677 A1 | 3/2015 | Ebefors |
| 2015/0089977 A1 | 4/2015 | Li |
| 2015/0102852 A1 | 4/2015 | Limb et al. |
| 2015/0229028 A1 | 8/2015 | Billy et al. |
| 2015/0318618 A1 | 11/2015 | Chen et al. |
| 2015/0348940 A1 | 12/2015 | Woychik |
| 2015/0358021 A1 | 12/2015 | Limb et al. |
| 2015/0372389 A1 | 12/2015 | Chen et al. |
| 2016/0137548 A1 | 5/2016 | Cabral, Jr. et al. |
| 2017/0012101 A1 | 1/2017 | Chua et al. |
| 2017/0036942 A1 | 2/2017 | Abramov et al. |
| 2017/0217831 A1* | 8/2017 | Hart ...................... C03C 17/006 |
| 2017/0292546 A1 | 10/2017 | Limb et al. |
| 2017/0334769 A1* | 11/2017 | Luzzato .................. C03C 3/076 |
| 2018/0009697 A1* | 1/2018 | He .......................... C03C 3/087 |
| 2018/0033577 A1 | 2/2018 | Whiting et al. |
| 2018/0033742 A1 | 2/2018 | Chua et al. |

* cited by examiner

DISSOLVABLE SEALANT FOR MASKING GLASS IN HIGH TEMPERATURE ION EXCHANGE BATHS

STATEMENT REGARDING FEDERALLY SPONSORED RESEARCH AND DEVELOPMENT

This invention was made with Government support under HR0011-16-C-0087 ONLY-DUST awarded by DARPA. The Government has certain rights in this invention.

FIELD OF THE INVENTION

This disclosure relates ion exchanged glass, more particularly to masking for ion exchange baths.

BACKGROUND

Ion exchanged glass typically involves immersing a piece of glass into an ion exchange bath. Typically, glass parts are immersed in a hot salt solution, and potassium ions in the solution migrate into the glass surface, replacing the smaller sodium ions originally in the glass. The glass part is then removed from the bath and cooled. As it cools, the larger potassium ions compress the glass and form a tough surface.

To control design complex, stress-varied ion exchanged glass undergoes masking prior to immersion. The masking blocks the ion exchange from a region or region of the glass so it does not become hardened or protected. The masked regions will break easier and allow control where the glass will break. Blocking the ion exchange may also alter the optical properties of the glass.

Currently, masking involves the use of thin films as masks, or complicated gasket systems. These methods may become cost-prohibitive. In addition, the use of gaskets limits the process by temperature and time because the gaskets melt. This limits the amount of time the glass can be immersed in the bath, reducing the effectiveness of the coating that forms in the non-masked regions.

SUMMARY

One embodiment is a method of masking glass in an ion exchange bath that includes applying a dissolvable sealant to a cover material, adhering the cover material to a glass part to form a mask on the glass part, immersing the glass part into an ion exchange bath. removing the glass part from the ion exchange bath, and using a solvent to dissolve the sealant and the cover material from the glass part.

Another embodiment is a mask on glass having a piece of glass, and a dissolvable sealant on a cover material, the dissolvable sealant comprising an inorganic material and a silicate, the dissolvable sealant between the cover material and the piece of glass.

DETAILED DESCRIPTION OF THE EMBODIMENTS

Figure 1:
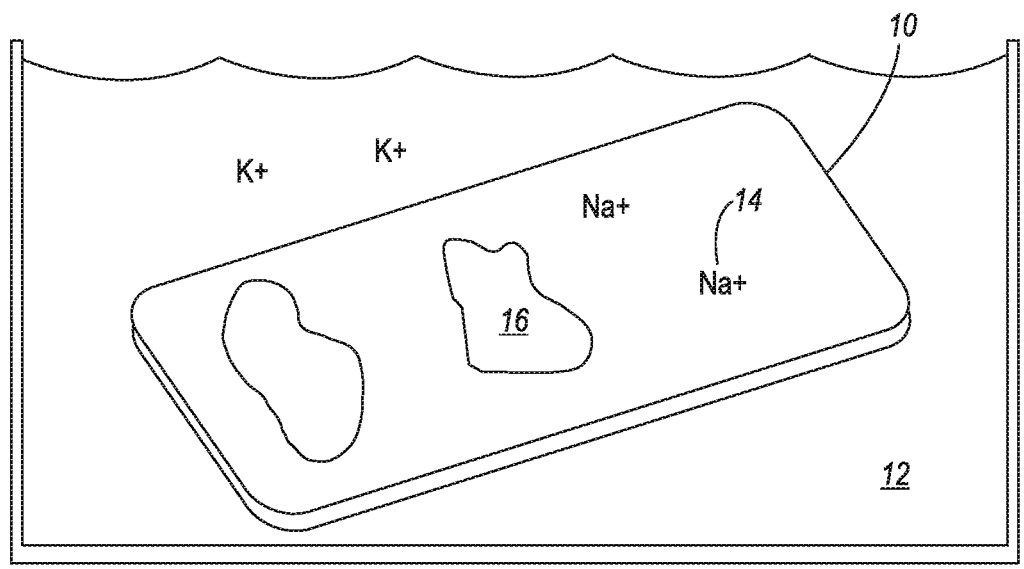
FIG. 1 shows a glass part having cover material adhered with a masking material immersed in an ion bath.

FIG. 1 shows an embodiment of a masked glass part in an ion exchange bath. The glass part 10 is immersed in a heated, salt bath 12 for hardening. In this embodiment, the bath consists of a potassium (K+) solution, heated to at least 350° C. In one embodiment, the bath has a temperature range between 350-450° C. Both potassium and sodium silicate sealants will survive easily to the higher temperatures within the range, with melting points at 800 or 1000° C. These temperatures are well above most ion exchange baths currently in use. During the immersion, uncovered portions of the glass will undergo an ion exchange between the sodium (Na+) ions in the glass and the larger potassium ions in the solution. When the part exits the bath and cools, the larger ions form a tougher layer that acts as a protective barrier for the rest of the glass part.

The portion 14 of the glass shows that the potassium ions have become resident in the glass 10. One should note that this is just for ease of discussion. The exchange between ions occurs across the unmasked portions of the glass part simultaneously. The masked portions, such as that under the cover material piece 16, either do not undergo ion exchange or undergo it at rate slower than the rest of the part. This reduces the likelihood that the protective barrier mentioned above will form. The result is a glass part with a varied stress profile. Having a varied stress profile may have several advantages including the ability to control at what region the glass will break, can affect the optical properties to cause an optical gradient, and create shape distortions.

Figure 3:
FIG. 3 shows an embodiment of a cover material shaped to cause shape distortion.
Figure 4:
FIG. 4 shows an embodiment of a cover material and piece of glass with shape distortion.
Figure 5:
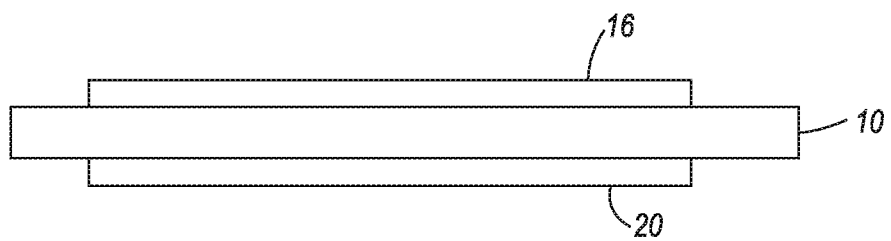
FIG. 5 shows an embodiment of a piece of glass having cover material on opposite sides.

As shown in FIG. 3, one can mask a larger area of the glass 10 with the cover material. This may cause mechanical stress from the ion exchange to push outwards from the cover material. This may result in a shape distortion in the form of a curve as shown in FIG. 4. In order to avoid the shape distortion, one can place a corresponding piece of cover material 20 on the underside of the glass. One should note that in FIGS. 3-5, the adhesive is not shown to simplify the drawings.

The mask portion 14 may attach to the glass part with an adhesive or sealant. In the embodiments, here, the sealant is dissolvable. In one embodiment, the adhesive has a thickness sufficient to ensure that there is no contact between the glass part and the ion bath. Referring back to FIG. 2, the glass part 10 has the pieces of cover material such as 16 attached with a dissolvable adhesive 18. The dissolvable sealant attaches the pieces of cover material and is easily dissolvable. Examples of the sealant may include potassium silicate, and sodium silicate. The sealant does not always form an even coating as shown in FIG. 2.

Figure 2:
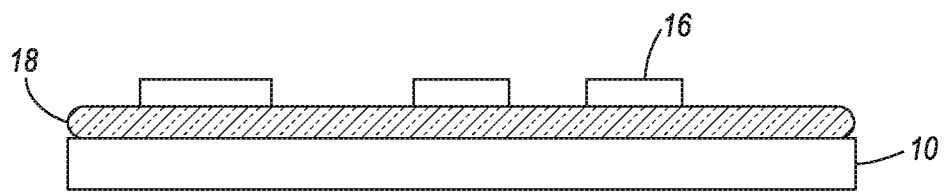
FIG. 2 shows a cross section of a cover material adhered to a glass part.
Figure 6:
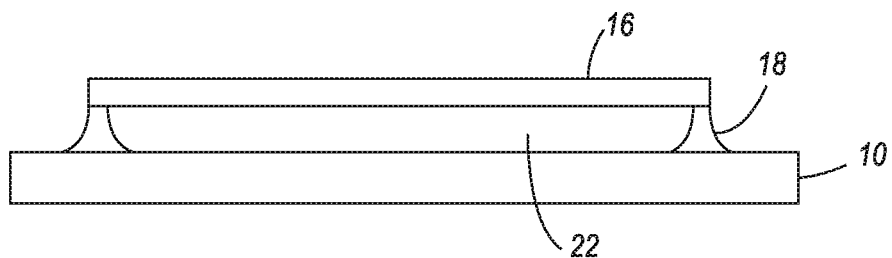
FIG. 6 shows an embodiment of a method of masking a glass part.
Figure 7:
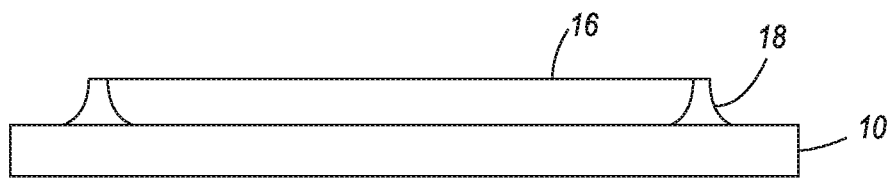
FIG. 7 shows an embodiment of a piece of cover material raised from a piece of glass by a sealant.

FIGS. 6-7 show other variations of the sealant from that shown in FIG. 2. In FIG. 6, the sealant 18 acts as both a sealant and a support structure to raise the cover material 16 from the glass 10. The resulting structure has an air gap 22. In an alternative embodiment, the cover material 16 resides directly in contact with the glass 10, and is held in place with sealant 18 at the edges of the cover material.

Figure 8:
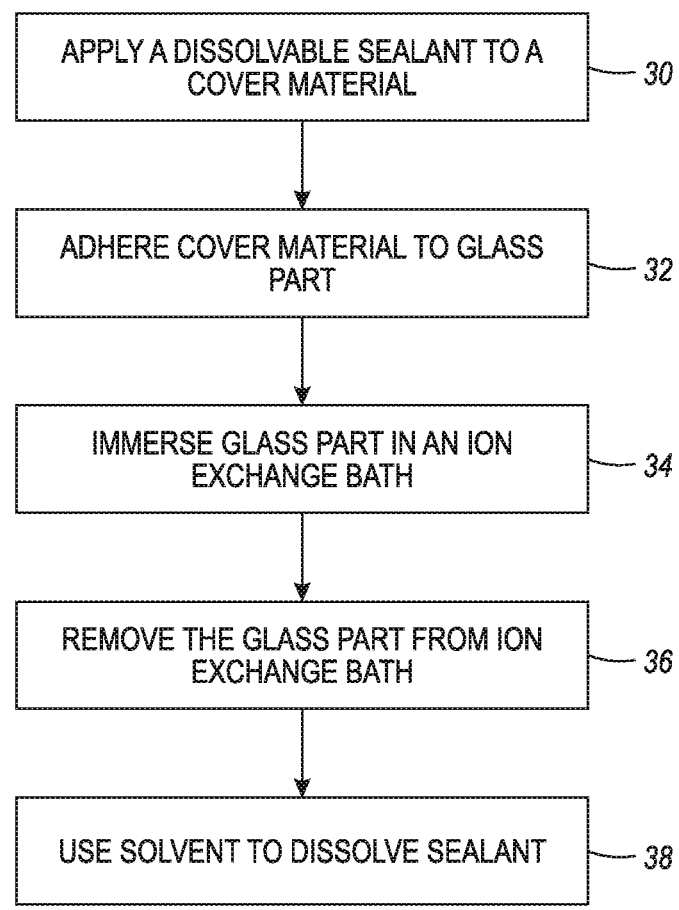
FIG. 8 shows an embodiment of a piece of cover material residing on a piece of glass with sealant at the edges.
Figure 9:
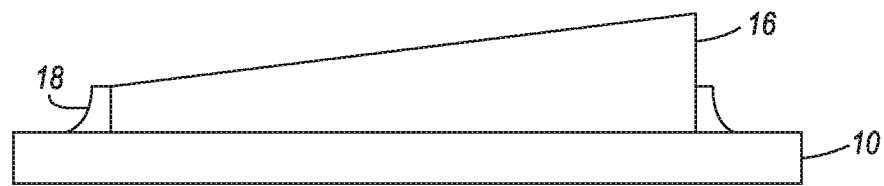
FIG. 9 shows an embodiment of a piece of cover material having a varying thickness.

FIG. 8 shows an embodiment of a method of masking glass in an ion exchange bath. At 30, the dissolvable sealant is used to attach the cover material 16 to the glass part. The cover material may consist of any material that either slows or blocks the ion transfer between the bath and the glass. By altering the thickness of the cover material, one can alter the stress gradient of the glass. As shown in FIG. 9, the cover material 16 has a varied thickness. The thicker areas slow the ion exchange, so the thinner areas and the thicker areas have a different ion profile after exiting the bath. This causes the gradient.

The sealant then adheres the cover material to the glass at 32. Once the glass has the cover material attached, it is immersed in the ion bath. The ion bath may consist of sodium nitrate, or potassium nitrate, depending upon the sealant, the solvent used later to dissolve it, and the substrate. The combinations of the sealant, bath ingredients and the solvent are shown in the table below:

| Substrate | Sealant | Bath | Solvent |
| --- | --- | --- | --- |
| Lithium doped silicate glass | Sodium Silicate | Sodium Nitrate | Water |
| Sodium doped silicate glass | Potassium silicate | Potassium nitrate | Water |
| Sodium doped silicate glass | Sodium silicate | AgNO3/NaNO3 mixture | Water |
| Sodium doped silicate glass | Potassium silicate | AgNO3/KNO3 mixture | Water |

Figure 10:
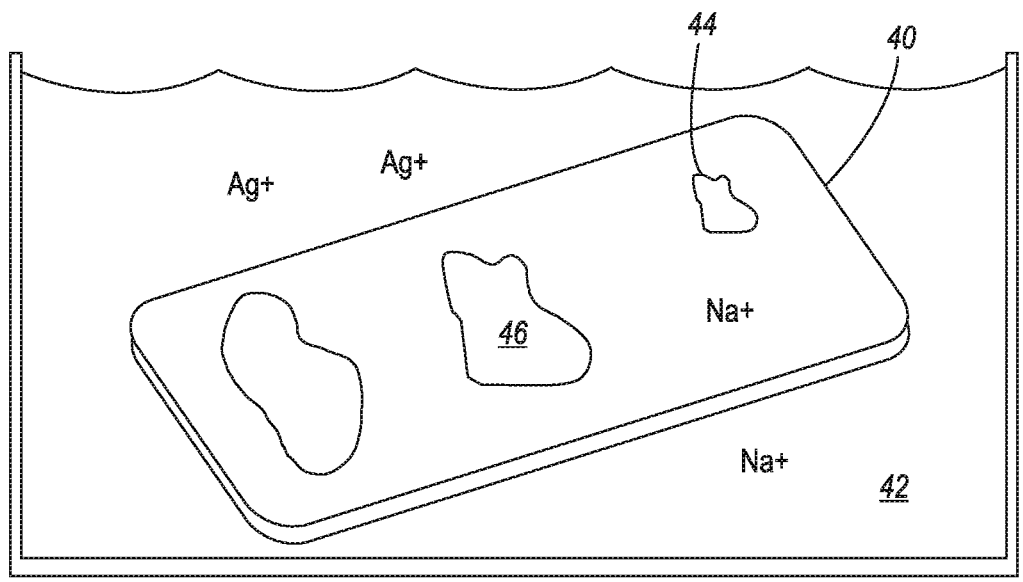
FIG. 10 shows a glass part having cover material adhered with a masking material immersed in a doping bath.

The sodium doped silicate glass using sodium silicate in the AgNO3/NaNO3 bath does not create any stress gradients in the bath. This creates a dopant gradient, such as Ag+ ions. This type of bath is shown in FIG. 10. The glass piece 40 is immersed in the AgNO3/NaNO3 bath 42 with Ag+ and Na+ ions. The cover pieces 46 mask the glass, but some regions of the glass becomes Ag+ doped. This application may have uses for optical waveguides because the Ag+ doped areas change the refractive index of the glass. There is no shape distortion with this combination. In the combination of sodium doped silicate glass with potassium silicate would create stress and silver doped ion exchange gradients.

Returning to FIG. 8, once the ion exchange bath has had a sufficient time to allow the ion exchange to complete, the glass part is removed from the bath at 26. After cooling, a solvent is applied at 28. The solvent should dissolve the sealant at 28, but will not affect the glass, either the masked or unmasked portions. This allows removal of the cover material easily and simply, rather than a complicated gasket system or expensive and hard to remove thin films.

In this manner, one can provide a piece of glass having a varied stress profile. This allows control of different variables to achieve a desired profile. This may include controlling regions where breaks may occur.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of masking glass in an ion exchange bath, comprising:
    applying a dissolvable sealant to a cover material;
    adhering the cover material to a glass part to form a mask on the glass part;
    immersing the glass part into an ion exchange bath;
    removing the glass part from the ion exchange bath; and
    using a solvent to dissolve the sealant to allow removal of the cover material from the glass part, wherein the solvent does not affect the glass part.

2. The method of claim 1, wherein the cover material comprises one of a group consisting of: metals, ceramics, glass, and aluminum.

3. The method of claim 1, wherein the dissolvable sealant comprises one of sodium silicate or potassium silicate.

4. The method of claim 1, wherein the cover material is of a material that has controlled diffusion of ions from the ion exchange bath.

5. The method of claim 1, wherein the sealant is applied to a thickness that prevents contact between the cover material and the glass part.

6. The method of claim 1, wherein the sealant is applied to form a support for the cover material to form an air gap between the cover material and the glass part.

7. The method of claim 1, wherein the sealant is applied to the cover material such that the sealant only contacts edges of the cover material.

8. The method of claim 1, wherein the cover material has an irregular shape.

9. The method of claim 1, wherein the bath comprises a mixture of silver and sodium, and the glass becomes doped with silver and the optical refractive index of the glass changes.

10. The method of claim 1, wherein the cover material is shaped to cause shape distortions in the glass.

11. The method of claim 10, further comprising adhering a second piece of the cover material to an opposite side of the glass from the cover material to avoid the shape distortions that take the form of a curve.

* * * * *